June 1, 1954
W. M. CHAMBERS
2,680,182
WELDING MACHINE
Filed Jan. 2, 1953
3 Sheets-Sheet 1
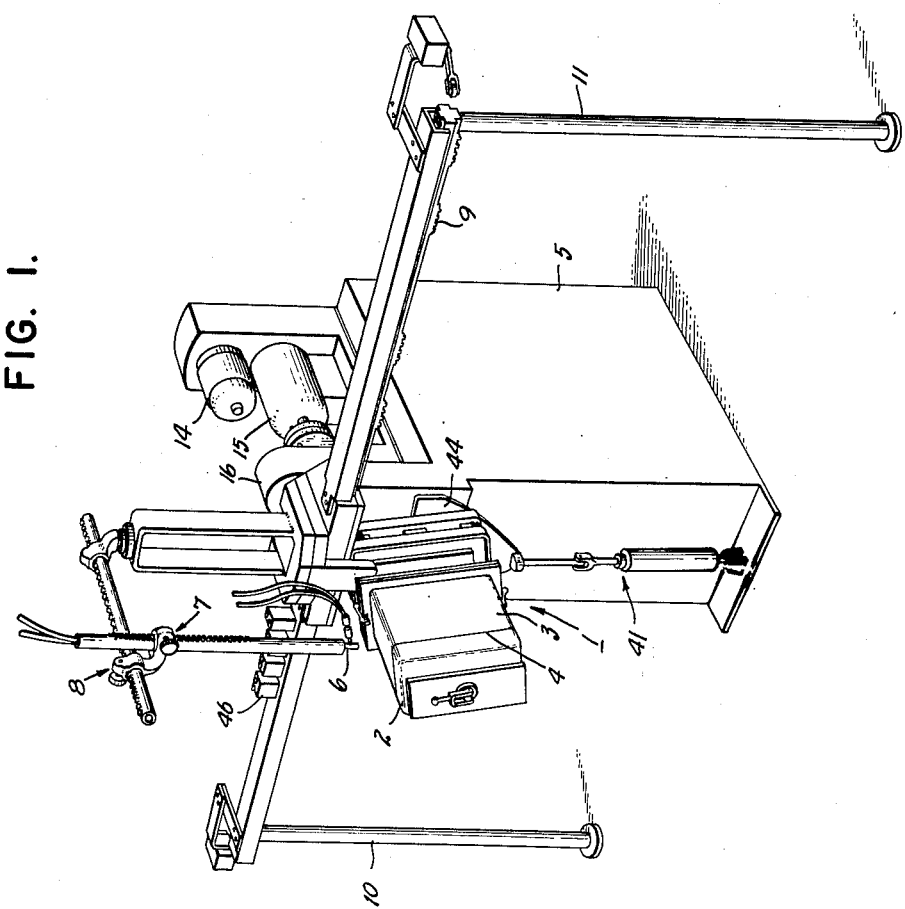
FIG. I.
INVENTOR.
WILLIAM M. CHAMBERS
BY Philip M. Bolton
ATTORNEYS June 1, 1954 W. M. CHAMBERS 2,680,182
WELDING MACHINE
Filed Jan. 2, 1953 3 Sheets-Sheet 2
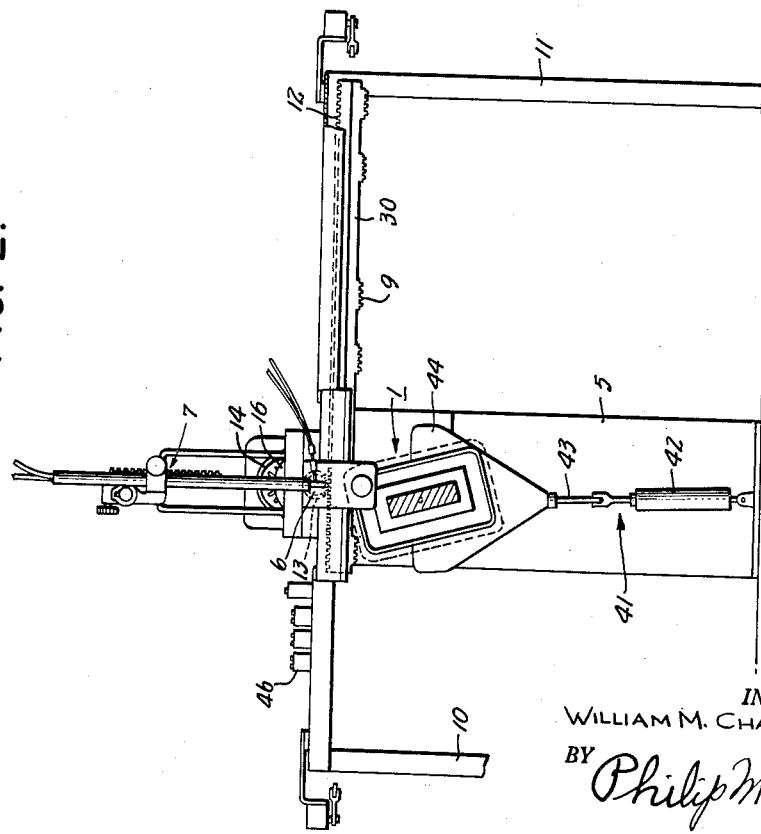
INVENTOR.
WILLIAM M. CHAMBERS
BY Philip M. Bolton
ATTORNEYS June 1, 1954

W. M. CHAMBERS 2,680,182

WELDING MACHINE

Filed Jan. 2, 1953

INVENTOR.
WILLIAM M. CHAMBERS
BY Philip M. Bolton
ATTORNEYS

Patented June 1, 1954

2,680,182

UNITED STATES PATENT OFFICE 2,680,182

WELDING MACHINE

William M. Chambers, Nutley, N. J., assignor to International Telephone and Telegraph Corporation, a corporation of Delaware Application January 2, 1953, Serial No. 329,219

9 Claims. (Cl. 219—8)

This invention relates to a welding machine, and particularly to a welding machine in which the welding torch is held relatively fixed and the work piece, which is being welded, is moved with respect to the torch.

More specifically, this invention relates to a welding machine in which the axis of the welding torch and a line from the point of weld to the axis perpendicular to the plane of the contour of the weld, are substantially coplanar; preferably coplanar in the vertical plane.

Welding machines are known in which the work piece is held in the flat or horizontal position, and the axis of the torch is positioned perpendicularly thereabove; usually in this type of machine the torch is mechanically moved over the work piece. Several methods of automatically controlling the movement of the torch in welding machines of this type are well known. However, welding machines of this type are to be contrasted with machines in which the torch and the work piece are coplanar, and especially when they are coplanar in the vertical plane. The problems which attach to the latter type of welding machine are completely absent in the first type of welder. For example, in the first type, there is no problem of the molten material dripping, and, more significant, there is no problem of maintaining the torch a fixed distance above the work piece. In the latter type welding machine, these problems not only exist, but become extremely important, and should be solved before a uniform and proper weld can be achieved. In addition, there is the problem of moving the work piece at a uniform speed while simultaneously maintaining the distance constant between the work piece and the torch.

In the past, welding in the vertical plane has been largely limited to linear and unidirectional welds; and, when the job required welding in more than one direction (for example, the perimeter of a rectangular box) the linear portions were welded automatically by a machine and the corner portions or arcuate portions were done manually. Obviously, this is time consuming and expensive.

Accordingly, it is an object of this invention to overcome each of the above-mentioned difficulties, and to provide a welding machine which is capable of welding a three-dimensional work piece in which the contour of the weld may be defined by intersecting directional lines, including arcuate lines at the points of intersection.

In accordance with a broad aspect of the invention, there is provided a machine for welding a three-dimensional work piece with a relatively fixed welding torch in which the axis of the torch and a line from a point of weld to an axis of the work piece perpendicular to the plane of the contour of the weld are substantially coplanar, and radial lines extending from the work piece axis to various points along the contour are of different lengths. The invention is characterized by providing means for moving said work piece rotationally with respect to said axis and linearly with respect to the torch, the rotational and linear speeds being equal; and means for maintaining said work piece a predetermined distance from the torch during the movement of said work piece.

The above-mentioned and other features and objects of this invention and the manner of attaining them will become more apparent and the invention itself will be best understood, by reference to the following description of an embodiment of the invention taken in conjunction with the accompanying drawings, wherein:

Fig. 1 is a perspective view of the welding machine showing a work piece in position for welding;

Fig. 2 is a front view of the welding machine;

Fig. 3 is a side view of the machine;

Figure 4:
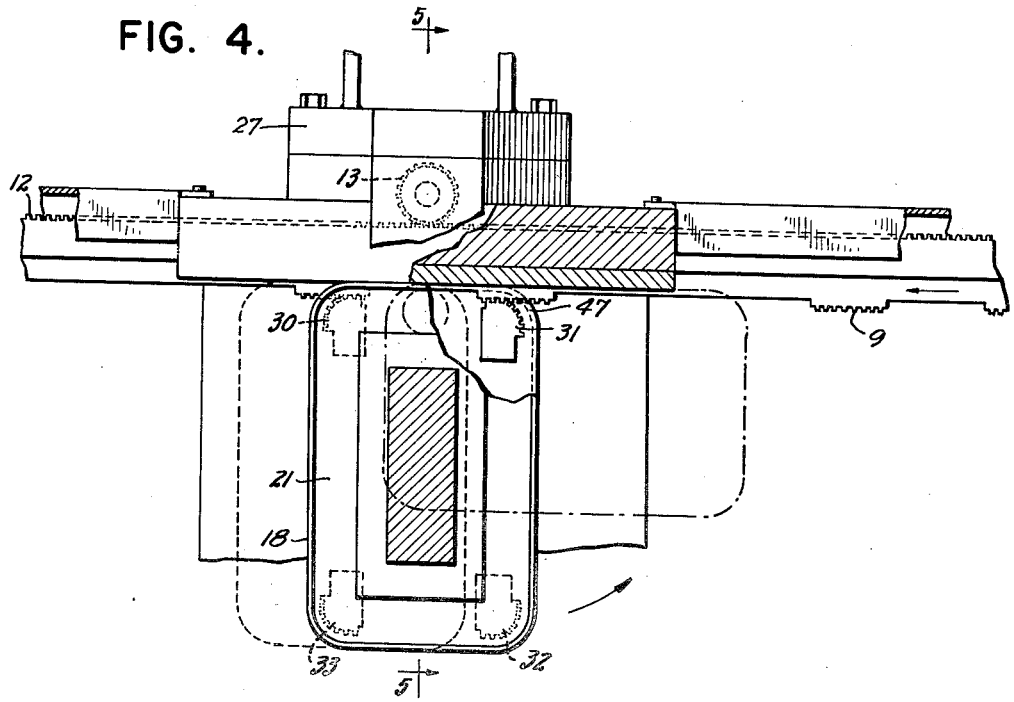
Fig. 4 is an enlarged view of a portion of Fig. 2.

It is to be understood that although my invention has particular application to machines using a high temperature arc, such as a heli-arc, the invention has broader application and is suitable in any case where it is necessary to weld a three-dimensional work piece in a vertical plane.

Referring now to Figs. 1, 2 and 3, there is shown a heli-arc welding machine for welding a three-dimensional work piece 1, comprising parts 2 and 3; the joint to be welded being indicated at 4 represents the contour of the weld. It is seen that for any work piece having unequal sides, such as a parallelepiped, that if radial lines were extended from an imaginary axis, to various points along the contour, the lengths of the radial lines would be different. The welding machine comprises a base structure 5 on which the various parts to be described hereinafter are fastened. A heli-arc welding torch 6, of the type well known to the art, is positioned vertically above the joint 4 of the work piece 1 and is preferably coplanar with the plane of the contour. The torch 6 is adjustably secured to the base structure 5 over a first rack and pinion assembly, generally indicated at 7, for adjusting the height of the torch, and a second rack and pinion assembly, generally indicated at 8, for adjusting the axial distance of the torch with respect to the base structure 5.

A gear rack 9 is provided which extends laterally in front of the structure 5 and is supported on a pair of stanchions 10 and 11. Above the rack 9 there is positioned a pinion rack 12 (see Fig. 4) which may be integral with the rack 9 or mechanically fastened thereto. A pinion 13, driven by a conventional driving source, is provided for engaging and driving the rack 12. The driving source may include a motor 14, a servo mechanism 15, speed transfer box 16, and a shaft 17 coupled to the pinion 13.

Figure 5:
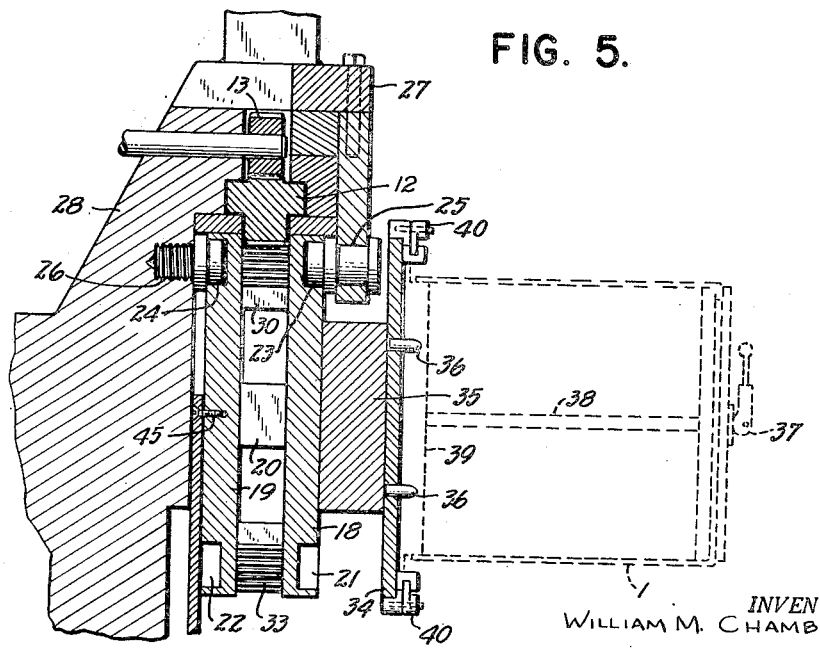
Fig. 5 is a view taken along lines 5—5 of Fig. 4.

The means for moving the work piece 1 at a uniform speed and maintaining the work piece at a predetermined distance below the torch 6 may be best seen in Figs. 4 and 5. The means comprises a pair of plate members 18, 19 fastened together back-to-back in spaced relationship by means of spacers 20. The plates 18, 19 may be fastened together in accordance with any of the well known means; e. g., bolts, weld, etc. The shape of the plate members 18 and 19 preferably conform to the contour of the weld. By way of example, the work piece is shown as a rectangular box and the contour of the weld joint is rectangular; therefore, it is preferable that the plate members 18 and 19, also be rectangularly shaped. Further, although two plate members are illustrated, it is to be understood that only one plate member may be used, but that two provide better mechanical support for the work piece. The outside surface of the plates 18 and 19 have formed therein identical tracking grooves 21, 22 respectively; the contour of the grooves being geometrically similar, and parallel, to the contour of the weld on the work piece. Therefore, if the contour of the weld is elliptical or even reentrant, the contour of the tracking grooves would correspond. A pair of disk-shaped followers 23, 24, preferably rotatably mounted in bushings 25, 26 respectively, are positioned to ride within the grooves and support the plate members 18, 19. A bridge member 27 located over the pinion rack 12, is attached at one end to the upright 28 of the base structure 5. The follower 24, as shown, may be directly mounted in the upright 28, and the follower 23 may be mounted via its shaft in bushing 25 which is fixed in a depending extension from the bridge 27. The bridge member 27 is fastened to the base structure 5 to prevent longitudinal movement of the followers 23 and 24. Between the plate members 18 and 19 there are positioned fixed gears 30, 31, 32 and 33. The gears may be fixed between the plates in accordance with any of the well known means. At least one gear is positioned to engage the rack gear 9 each time the tracking grooves make a directional change. Therefore, in accordance with the example shown, since the tracking grooves are rectangular, there are four directional changes corresponding to the four sides of the rectangle, and thus, four fixed gears are required to engage the rack 9, one for each change. The work piece 1 is detachably secured to a fixture 34 which is attached to the plate member 18 over a spacer 35. The spacer 35 permits the work piece to be located at a desirable distance from the plate members 18 and 19. The fixture 34 is secured to the spacer 35 by means of stakes or pins 36. The work piece 1 is pressed against the fixture by well known means, such as a clamp 37, forcing the work piece against the fixture 34. The clamp 37 is coupled to a rod 38 which is fastened to a plate member 39, which in turn is secured by clamping means 40 to the fixture 34. The work piece is forced over a portion of the plate 39, which is shaped to tightly embrace the work piece, and upon clamping the work piece to the fixture, a rigid union between the two parts is effected.

A dash-pot-type absorber generally indicated at 41 is provided to retard the rate of change of direction of the plate members 18 and 19. Referring to Fig. 4, there is shown by solid lines the plate members in one position, and by dot and dash lines, the plate members in a second position. It is seen that unless some means is provided to retard the change from one direction to the other, the fixed gears would hit with damaging impact against the gear rack. Therefore, to prevent damage from this source, the shock absorber 41 is provided. In addition, the shock absorber prevents the plate members from falling unrestrictedly when the change is from the position shown by the dot and dash lines to the solid lines, after the plate members have been moved to the left-most position. The direction of movement is indicated by the arrows. The illustrated shock absorber 41 is a well known type and comprises an air-cylinder 42 and a piston attached by an arm 43 to a pivotally mounted baffle plate 44. The baffle plate 44 (see Fig. 5) is pivotally mounted at 45 to the plate member 19.

Switching means, generally shown at 46 (see Fig. 1) is provided to control the power for the driving source. When the power is switched on, the pinion is rotated to drive the pinion rack 12. The rack 9 moving integrally with rack 12, normally engages two of the fixed gears, for example 30 and 31 shown in Fig. 4, thereby moving the plate members 18, 19 together with the work piece 1. During this period the work piece is moving linerally with respect to the torch. When the followers engage the arcaute portions 47 of the track grooves, the work piece is turned in a different direction with respect to the torch, or, is rotated with respect to the axis perpendicular to the plane of the contour of the weld, until the plate members are turned to the position shown by dot and dash lines in Fig. 4. During the rotation of the plate members from one position to the other, only one fixed gear is engaged with the gear rack, and upon completion of the turn, the second fixed gear engages another gear of the rack. Therefore, it is seen that the gears on the rack 9 may be distributed and positioned only to engage the fixed gears, thus obviating the necessity for one long continuous rack gear.

It should be realized by one experienced in the art that the linear speed of the work piece with respect to the torch is determined by the speed of the gear rack, and that the rotational speed during the change of directions is determined by the speed of the rack and the radii of the arcuate portions joining the different sides of the weld contour. Of course, to obtain a uniform weld, the rotational speed should be equal to the linear speed. Further, it should be realized that the length of the gear rack is desirably slightly longer than the length of the contour so that one complete movement of the rack in one direction turns the work piece with respect to said torch whereby the joint is completely welded with a slight overlap at the beginning thereof. An advantage to arranging the rack in this manner is that a complete weld is effected each time the rack moves completely in one direction and therefore, two work pieces are completed when the rack returns to its original position.

While I have described above the principles of my invention in connection with specific apparatus, it is to be clearly understood that this description is made only by way of example and not as a limitation of the scope of my invention as set forth in the objects thereof and in the accompanying claims.

What is claimed is:

1. In a machine for welding together two parts of a work piece with a relatively fixed welding torch and in which the axis of the torch and radial line extending from an axis of the work piece substantially perpendicular to the plane of the contour of the welded joint to points on the same contour are substantially coplanar, and the work piece being of such dimensions that the radial lines extending from the axis of the contour to the point of weld are of different lengths, characterized in that there are provided means for supporting said work piece a given distance from said torch, means for moving said work piece rotationally about said contour axis and linearly with respect to said torch, and means for maintaining said work piece a predetermined distance from said torch during said movement, said work piece being three-dimensional and the contour of the weld extending around said work piece, said means for moving said work piece comprising a gear rack, means for driving said rack at a given constant speed, a plate member having one surface thereof provided with a tracking groove, the contour of which is geometrically similar to the contour of the weld on said work piece, a follower positioned to ride within said groove, fixed gears mounted on the opposite surface of said plate member, at least one of said gears being positioned to engage said rack gear each time it is desired to produce a directional change in said plate member, said plate member being driven by said rack and the directional movement thereof corresponding to the contour of said groove, the contour of the welded joint being substantially parallel to the contour of said groove, and in a plane vertically below said torch.

2. The machine according to claim 1 and further comprising a second plate member fastened back-to-back in spaced relationship with the first plate member, the outside surfaces thereof having identical tracking grooves, a second follower positioned to ride within the groove of said second plate member, whereby additional support is provided for holding and moving said work piece.

3. A heli-arc welding machine for welding around a three-dimensional work piece, comprising a base structure, a welding torch positioned vertically above the joint of said work piece, and the axis of said torch being coplanar with the contour of said weld, means adjustably securing said torch to said structure, a gear rack extending laterally in front of said structure, driving means for said rack fastened to said structure; means for moving said work piece linearly with respect to said torch and rotationally with respect to the axis perpendicular to the plane of said contour, the movement being at a uniform speed with respect to said torch, said means maintaining said work piece at a predetermined distance below said torch during said movement, whereby dripping of molten material is minimized and the weld along the entire work piece is uniform, said means comprising a plate member, one surface thereof having a tracking groove, the contour of which is geometrically similar to the contour of the weld on said work piece, a follower positioned to ride within said groove, means fastening said follower to said base structure to prevent longitudinal movement of said follower, fixed gears mounted on the opposite surface of said plate member, and at least one positioned to engage said rack gear each time it is desired to produce a directional change in said plate member, said plate member being driven by said rack and the directional movement thereof corresponding to the contour of said groove, and means attaching said work piece to said plate member, the contour of the welded joint being substantially parallel to the contour of said groove, and in a plane vertically below said torch.

4. The machine according to claim 3, wherein the contour of said weld is rectangularly shaped and said tracking groove is rectangularly shaped corresponding to said contour, and said fixed gears are mounted at a position corresponding to the corners of said rectangularly shaped groove, whereby a fixed gear will engage said rack gear each time the direction of said plate member is changed.

5. The device according to claim 3, wherein said rack gear is discontinuous and the gear teeth are located only where engagement with said fixed gears is required.

6. The machine according to claim 3, wherein the length of said gear rack is slightly longer than the length of said contour whereby the complete movement of said gear rack in one direction moves the work piece with respect to said torch to produce a complete weld thereof.

7. A heli-arc welding machine for welding around a three-dimensional work piece, comprising a base structure, a welding torch positioned vertically above the joint of said work piece, and the axis of said torch being coplanar with the contour of said weld, means adjustably securing said torch to said structure, a gear rack extending laterally in front of said structure, driving means for said rack fastened to said structure; means for moving said work piece linearly with respect to said torch and rotationally with respect to the axis perpendicular to the plane of said contour, the movement being at a uniform speed with respect to said torch, said means maintaining said work piece at a predetermined distance below said torch during said movement whereby dripping of molten material is minimized and the weld along the entire work piece is uniform, said means comprising a pair of rectangularly shaped plate members fastened together back-to-back in spaced relationship, the outside surfaces thereof having identical tracking grooves, the contours of which are geometrically similar to the contour of the weld on said work piece, a pair of rotatably mounted disk shaped followers positioned to ride with said grooves, means fastening said followers to said base structure to prevent longitudinal movement of said followers, pinion gears positioned between said rectangularly shaped plate members one at each corner thereof and adapted to engage said rack gear, said plate members being driven by said rack and the movement thereof corresponding to the contour of said grooves, and means attaching said work piece to said plate members, the contour of the welded joint being substantially parallel to the contour of said grooves, and in a plane vertically below said torch.

8. The machine according to claim 7, further comprising a shock absorbing device having an air cylinder, a movable piston within said cylinder adapted to compress the air upon longitudinal movement thereof, a baffle plate pivotally connected to said plate members, and an arm coupled between said piston and said baffle plate, whereby the rate of change in direction of said plate members is retarded by said shock absorber.

9. The machine according to claim 7, wherein the length of said gear rack is slightly longer than the length of the contour of said weld, whereby the complete movement of said gear rack in one direction moves the work piece with respect to said torch to produce a complete weld thereof.

References Cited in the file of this patent

UNITED STATES PATENTS

| Number | Name | Date |
| --- | --- | --- |
| 1,957,489 | Comstock | May 8, 1934 |
| 1,975,578 | Kenney et al. | Oct. 2, 1934 |
| 2,280,627 | Chapman | Apr. 21, 1942 |
| 2,303,720 | Berkeley | Dec. 1, 1942 |

FOREIGN PATENTS

| Number | Country | Date |
| --- | --- | --- |
| 141,118 | Austria | Mar. 25, 1935 |